United States Patent
Inaba et al.

(10) Patent No.: US 7,541,758 B2
(45) Date of Patent: Jun. 2, 2009

(54) MOS RECTIFYING DEVICE, DRIVING METHOD THEREOF, AND MOTOR GENERATOR AND MOTOR VEHICLE USING THEREOF

(75) Inventors: Masamitsu Inaba, Chiyoda-ku (JP); Shinji Shirakawa, Chiyoda-ku (JP); Masahiro Iwamura, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 279 days.

(21) Appl. No.: 11/206,225

(22) Filed: Aug. 18, 2005

(65) Prior Publication Data

US 2006/0158162 A1 Jul. 20, 2006

(30) Foreign Application Priority Data

Jan. 19, 2005 (JP) ............................. 2005-011643

(51) Int. Cl.
*H02P 25/30* (2006.01)
(52) U.S. Cl. .................. 318/140; 318/802; 318/148; 318/153
(58) Field of Classification Search ............... 318/140, 318/148, 153, 400.26, 400.27, 400.29, 802; 323/237; 322/99, 23, 28; 363/41, 95
See application file for complete search history.

(56) References Cited

U.S. PATENT DOCUMENTS

| | | | | |
|---|---|---|---|---|
| 5,436,819 A | * | 7/1995 | Mikami et al. ............... | 363/41 |
| 5,708,352 A | * | 1/1998 | Umeda et al. ............... | 322/28 |
| 6,404,655 B1 | * | 6/2002 | Welches ...................... | 363/41 |
| 6,452,349 B1 | * | 9/2002 | Hahn et al. ............ | 318/400.22 |
| 6,845,022 B2 | * | 1/2005 | Yoshimura et al. ........... | 365/95 |
| 6,900,997 B2 | * | 5/2005 | Perreault et al. ............ | 363/127 |
| 7,019,991 B2 | * | 3/2006 | Yamashita .................... | 363/52 |
| 7,119,513 B2 | * | 10/2006 | Ishikawa .................... | 318/801 |
| 7,206,179 B2 | * | 4/2007 | Miyamoto .................. | 361/118 |
| 2005/0001582 A1 | * | 1/2005 | Goto et al. ................. | 318/802 |
| 2005/0073279 A1 | * | 4/2005 | Fenley ........................ | 318/717 |

FOREIGN PATENT DOCUMENTS

JP 2003-70256 3/2003
JP 2004-007964 1/2004

* cited by examiner

*Primary Examiner*—Bentsu Ro
*Assistant Examiner*—Antony M Paul
(74) *Attorney, Agent, or Firm*—Crowell & Moring LLP

(57) ABSTRACT

V-phase upper-arm open phase detecting circuit outputs a permission signal to allow U-phase lower-arm MOSFET to be conductive when the V-phase voltage is higher than the positive electrode potential. In response to this permission signal, U-phase lower-arm driver circuit drives U-phase lower-arm MOSFET. V-phase lower-arm open phase detecting circuit outputs a permission signal to allow U-phase upper-arm MOSFET to be conductive when the V-phase voltage is lower than the negative electrode potential. In response to this permission signal, U-phase upper-arm driver circuit drives U-phase upper-arm MOSFET.

Thereby, a MOS rectifying device capable of rectifying even when an open phase occurs, a driving method thereof, and a motor vehicle using thereof can be provided.

4 Claims, 11 Drawing Sheets

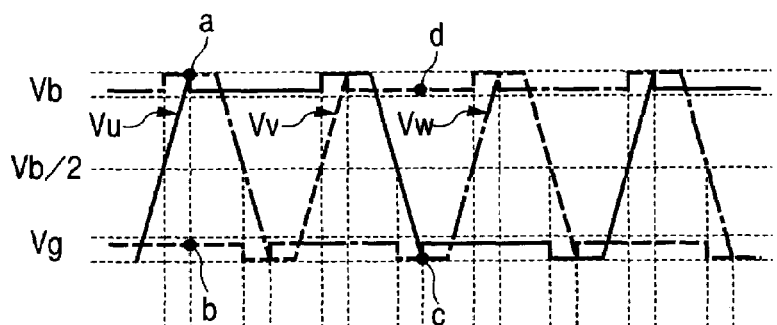
FIG. 5(A)
FIG. 5(B) UUG
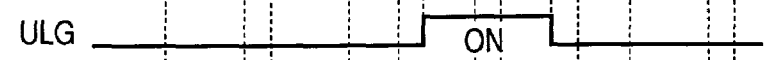
FIG. 5(C) ULG
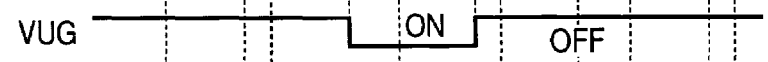
FIG. 5(D) VUG
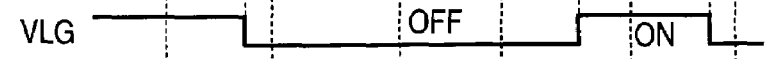
FIG. 5(E) VLG
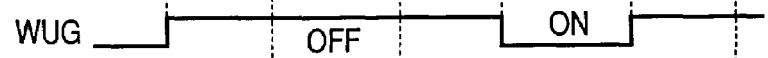
FIG. 5(F) WUG
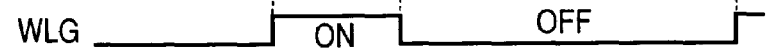
FIG. 5(G) WLG

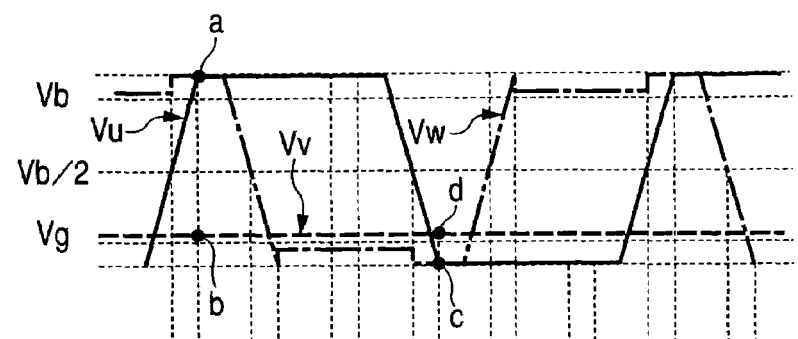
FIG. 8(A)
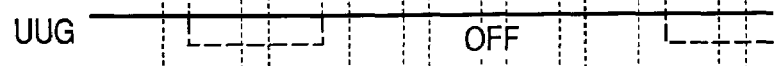
FIG. 8(B) UUG
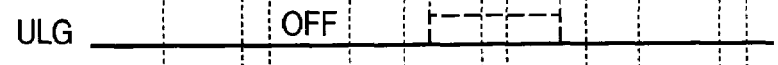
FIG. 8(C) ULG
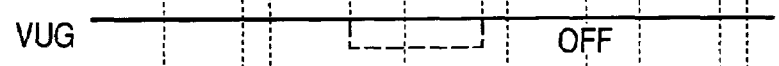
FIG. 8(D) VUG
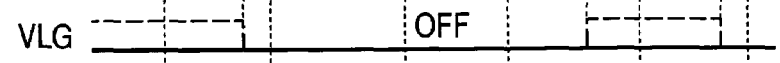
FIG. 8(E) VLG
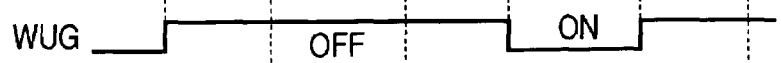
FIG. 8(F) WUG
FIG. 8(G) WLG

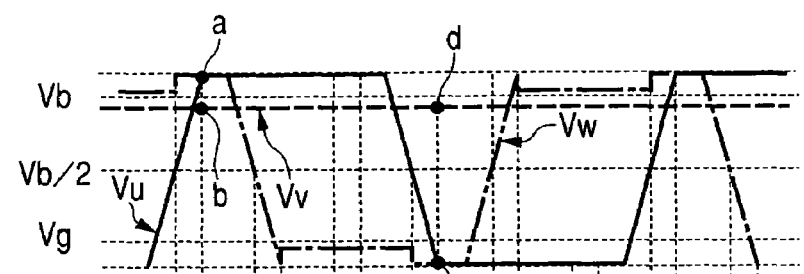
FIG. 9(A)
FIG. 9(B) UUG
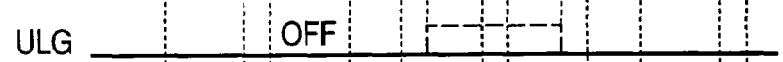
FIG. 9(C) ULG
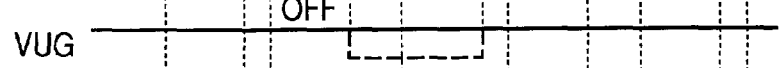
FIG. 9(D) VUG
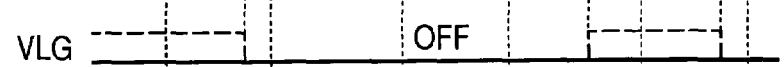
FIG. 9(E) VLG
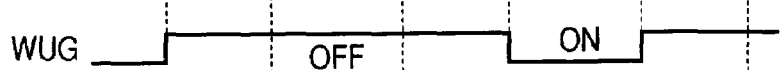
FIG. 9(F) WUG
FIG. 9(G) WLG

US 7,541,758 B2

MOS RECTIFYING DEVICE, DRIVING METHOD THEREOF, AND MOTOR GENERATOR AND MOTOR VEHICLE USING THEREOF

CLAIM OF PRIORITY

The present application claims priority from Japanese application serial no. 2005-11643, filed on Jan. 19, 2005, the content of which is hereby incorporated by reference into this application.

FIELD OF THE INVENTION

This invention relates to a MOS rectifying device, a driving method thereof, and a motor generator and a motor vehicle using thereof.

BACKGROUND OF THE INVENTION

A conventional known MOS rectifying device uses phase voltages to create timing to turn on and off MOS field effect transistors (MOSFETs) which constitute a 3-phase alternating-current generator as disclosed for example by Japanese Patent Laid-Open No. 2003-70256.

SUMMARY OF THE INVENTION

When an open phase occurs, the conventional control method cannot create turn-off timing and it sometimes happened that the upper and lower MOSFETs are simultaneously shorted and broken. An open phase means a phase voltage error that occurs 1) when U, V, and W terminals are open,
2) when U, V, and W terminals are short-circuited to the positive electrode terminal of the battery or to GND (ground) or
3) when U, V, and W terminals remain at a certain voltage.

An object of this invention is to provide a MOS rectifying device which can perform rectification normally even when an open phase occurs, a driving method thereof, and a motor generator and a motor vehicle using thereof.

This invention provides a MOS rectifying device which can perform rectification normally even when an open phase occurs.

The MOS rectifying device of this invention is mainly characterized by comprising a detector which outputs a permission signal to allow a lower-arm MOSFET, of a phase before the first phase, to be conductive when the phase voltage of the first phase is higher than a positive electrode potential of a secondary battery and a lower-arm driver which controls driving of said lower-arm MOSFET by the permission signal from the detector.

Further, this invention provides a method of driving a MOS rectifying device which can perform rectification without breaking its bridge circuit even when an open phase occurs.

The method of this invention is mainly characterized by fetching a phase voltage of the first phase and a phase voltage of the next phase at the same time, allowing the lower-arm MOSFET of said first phase to be conductive when the phase voltage of the next phase is higher than the positive electrode potential of the secondary battery, and allowing the upper-arm MOSFET of said first phase to be conductive when the phase voltage of the next phase is lower than the negative electrode potential of the secondary battery.

Further, this invention provides a motor generator equipped with a MOS rectifying device which can perform rectification normally even when an open phase occurs.

The motor generator of this invention is mainly characterized by a motor generator which houses a MOS rectifying device to switch MOSFETs by phase voltages of a 3-phase alternating-current generator wherein said MOS rectifying device comprises a detector which outputs a permission signal to allow a lower-arm MOSFET, of a phase before the first phase, to be conductive when the phase voltage of the first phase is higher than a positive electrode potential of a secondary battery and a lower-arm driver which controls driving of said lower-arm MOSFET by the permission signal from the detector.

Further, this invention provides a motor vehicle using a MOS rectifying device which can perform rectification normally even when an open phase occurs.

The motor vehicle of this invention is mainly characterized by a motor vehicle comprising a motor generator which houses a MOS rectifying device to switch MOSFETs according to phase voltages of a 3-phase alternating-current generator and a driving source to drive this motor generator wherein said MOS rectifying device is equipped with a detector which detects a phase voltage error (when occurred) in said 3-phase alternating-current generator, turns off said MOSFETs, and informs the host control unit of this error.

This invention enables MOS rectification without tuning on upper- and lower-arm MOSFETs at the same time and short-circuiting thereof when an open phase occurs.

BRIEF DESCRIPTION OF THE DRAWINGS

FIG. 5 shows waveform diagrams to explain the operation of the MOS rectifying device of this embodiment.

FIG. 8 shows waveform diagrams to explain the operation of the MOS rectifying device of this embodiment.

FIG. 9 shows waveform diagrams to explain the operation of the MOS rectifying device of this embodiment.

DESCRIPTION OF THE PREFERRED EMBODIMENTS

Below will be explained the configuration and operation of a MOS rectifying device which is an embodiment of this invention with reference to FIG. 1 to FIG. 9.

First will be explained the configuration of the inverter-housed motor generator which uses a MOS rectifying device of the embodiment with reference to FIG. 1.

Figure 1:
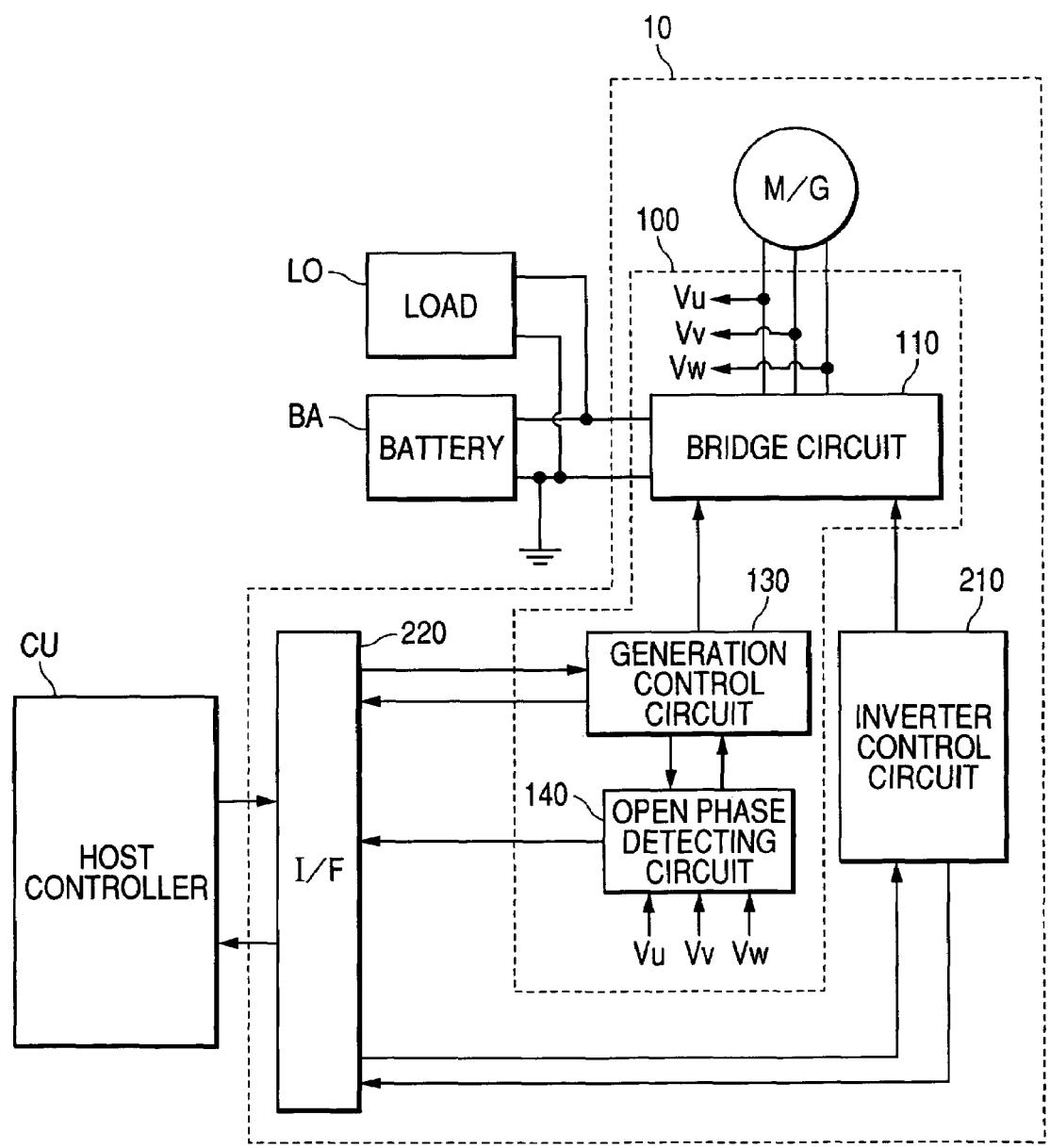
FIG. 1 shows a functional block diagram of an inverter-housed motor generator using a MOS rectifying device which is an embodiment of this invention.

FIG. 1 shows a functional block diagram of an inverter-housed motor generator using a MOS rectifying device which is an embodiment of this invention.

Inverter-housed motor generator (M/G) 10 comprises 3-phase motor generator M/G, MOS rectifying device 100 inverter control circuit 210, and interface circuit (I/F) 220. MOS rectifying device 100 receives A.C. voltage from 3-phase motor generator M/G, rectifies the A.C. voltage into a D.C. voltage, and sends it to battery BA which is a secondary battery for storage. The voltage of battery BA is for example, 14V. It is possible to use a 42-V battery instead of the 14-V battery. A required power is supplied to load LO from battery BA. MOS rectifying device 100 comprises bridge circuit 110, generation control circuit 130, and open phase detecting circuit 140. Bridge circuit 110 is made up with semiconductor switching elements such as MOSFET (Metal Oxide Semiconductor Field Effect Transistors). Generation control circuit 130 outputs gate signals to control the on/off status of the semiconductor switching elements to cause motor generator to generate power from phase voltages of motor generator M/G. Open phase detecting circuit 140 detects a phase voltage error (e.g. fixing a phase voltage to a battery voltage or grounding potential) of motor generator M/G. When detecting a phase voltage error, open phase detecting circuit 140 turns off a gate signal which generation control circuit 130 outputs to bridge circuit 110. This turns off a selected switching element in bridge circuit 110. When a gate signal is turned off in case a MOSFET is used as a semiconductor switching element, rectification changes from the previous MOS synchronous rectification to rectification by a body diode of MOSFET. When detecting an error, open phase detecting circuit 140 informs host controller CU of the occurrence of a phase voltage error through interface circuit 220. The detailed configuration of MOS rectifying device 100 will be explained later with reference to FIG. 2.

Inverter control circuit 210 controls on/off-turning of semiconductor switching elements in bridge circuit 110 and converts the D.C. voltage of battery BA into A.C. voltage so that motor generator M/G may work as an electric motor. A 3-phase A.C. voltage is supplied to motor generator M/G.

Host controller CU sends a generation control signal to generation control circuit 130 via interface circuit 220 and an inverter control signal to inverter control circuit 210. Further, generation control circuit 130 informs host controller CU of the error status (over-current, over-temperature, etc.) via interface circuit 220. Further, inverter control circuit 210 informs host controller CU of the error status (over-current, over-temperature, etc.) via interface circuit 220. When an open phase of a preset time period or longer detected by open phase detecting circuit 140, host controller CU can send a generation control signal to generation control circuit 130 to stop the entire MOS rectification and change to the diode rectification.

Even when any cut dust short-circuits a phase voltage terminal, for example, of a motor generator to a ground potential, this embodiment can assure high-accuracy rectification since the open phase detecting circuit changes from MOS rectification to diode rectification and prevents the upper- and lower-arm MOSFETs from being short-circuited.

Below will be explained the configuration of the MOS rectifying device of this embodiment with reference to FIG. 2.

Figure 2:
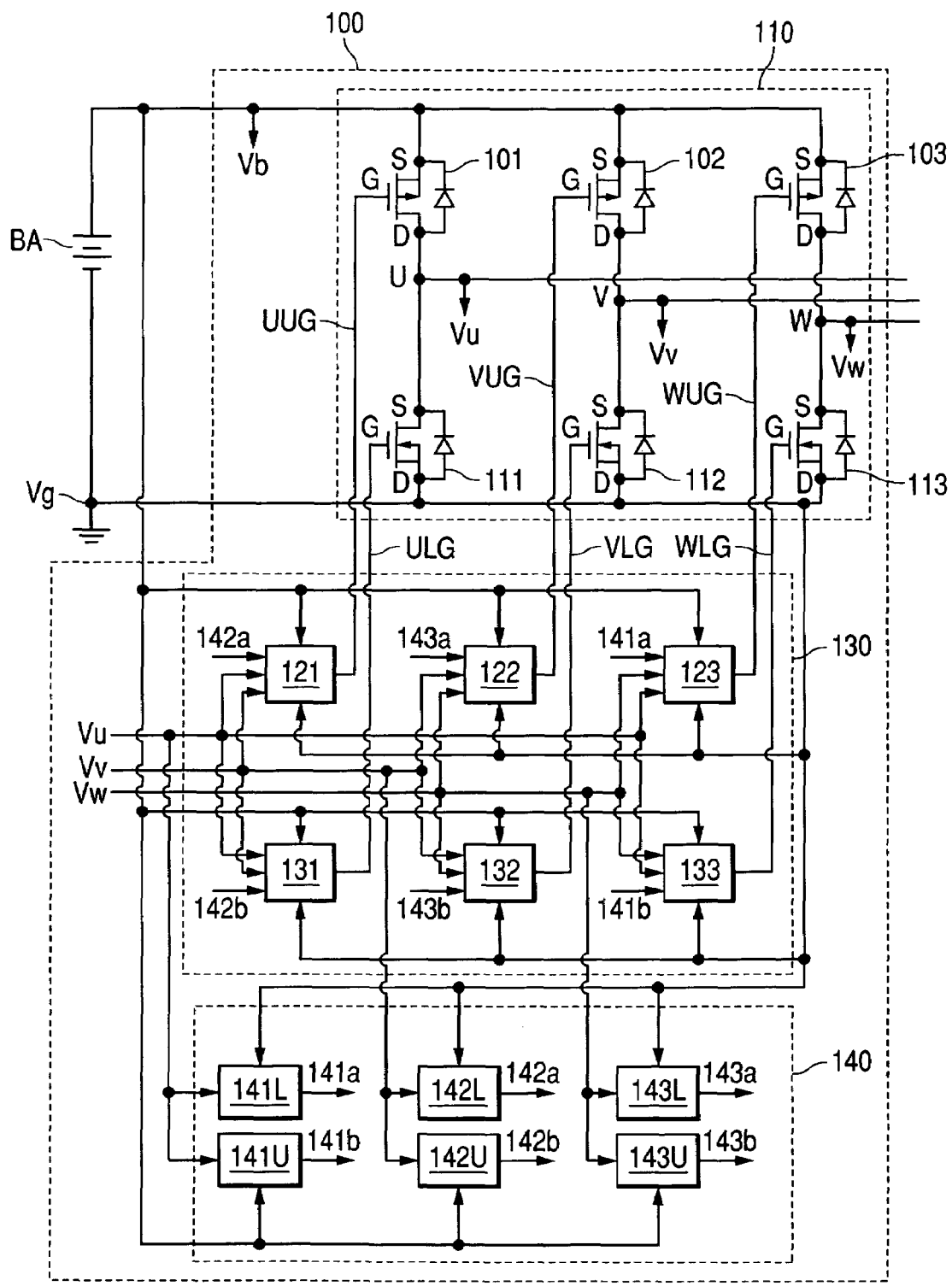
FIG. 2 shows the functional block diagram of a MOS rectifying device which is an embodiment of this invention.

FIG. 2 shows the functional block diagram of a MOS rectifying device which is an embodiment of this invention. In FIG. 1 and FIG. 2, like parts are designated by like reference numbers.

MOS rectifying device 100 comprises bridge circuit 110, generation control circuit 130, and open phase detecting circuit 140. Bridge circuit 110 consists of a set of U-phase upper arm MOSFET 101 and U-phase lower arm MOSFET 111 which are connected in series, a set of V-phase upper arm MOSFET 102 and V-phase lower arm MOSFET 112 which are connected in series, and a set of W-phase upper arm MOSFET 103 and W-phase lower arm MOSFET 113 which are connected in series. These three sets are connected in parallel to form a 3-phase MOS rectifier. Bridge circuit 110 is connected between battery BA and motor generator M/G. In the example of FIG. 2, upper-arm MOSFETs 101, 102, and 103 are p-MOS and lower-arm MOSFETs 111, 112, and 113 are n-MOS. However, all of these upper- and lower-arm MOSFETs can be either p-MOS or n-MOS.

Generation control circuit 130 consists of U-phase upper-arm driver circuit 121, V-phase upper-arm driver circuit 122, W-phase upper-arm driver circuit 123, U-phase lower-arm driver circuit 131, V-phase lower-arm driver circuit 132, and W-phase lower-arm driver circuit 133. For example, U-phase upper-arm driver circuit 121 receives U-phase voltage (Vu), V-phase voltage (Vv), battery voltage (Vb), and grounding voltage (Vg) and outputs a U-phase upper-arm gate signal (UUG). Similarly, the other arm driver circuits (122, 123, 131, 132, and 133) respectively receive input signals as shown in the figure and respectively output gate signals (VUG, WUG, ULG, VLG, and WLG). Upper-arm driver circuits of U-, V-, and W-phases (121, 122, and 123) are basically identical in configuration. The detailed configuration of U-phase upper-arm driver circuit 121 will be described referring to FIG. 3. Similarly, lower-arm driver circuits of U-, V-, and W-phases (131, 132, and 133) are basically identical in configuration. The detailed configuration of U-phase lower-arm driver circuit 131 will be explained referring to FIG. 4.

Open phase detecting circuit 140 comprises U-phase lower-arm open phase detecting circuit 141L, V-phase lower-arm open phase detecting circuit 142L, W-phase lower-arm open phase detecting circuit 143L, U-phase upper-arm open phase detecting circuit 141U, V-phase upper-arm open phase detecting circuit 142U, and W-phase upper-arm open phase detecting circuit 143U. U-phase lower-arm open phase detecting circuit 141L receives a U-phase voltage (Vu) and a grounding voltage (Vg) and outputs a signal (141a) to permit W-phase upper-arm MOS rectification. U-phase upper-arm open phase detecting circuit 141U receives a U-phase voltage (Vu) and a battery voltage (Vb) and outputs a signal (141b) to permit W-phase lower-arm MOS rectification. Similarly, other open phase detecting circuits 142L, 142U, 143L, and 143U respectively output MOS rectification permission signals 142a, 142b, 143a and 143b by input signals as shown in the figure. U-, V-, and W-phase lower-arm open phase detecting circuits 141L, 142L, and 143L are basically identical in configuration. The configuration of U-phase lower-arm open phase detecting circuit 141L will be explained referring to FIG. 3. U-, V-, and W-phase upper-arm open phase detecting circuits 141U, 142U, and 143U are basically identical in configuration. The configuration of U-phase upper-arm open phase detecting circuit 141U will be explained referring to FIG. 4.

Below will be explained the operation of MOS rectifying device 100 of this embodiment, using U-phase upper- and lower-arms.

First the operation of MOS rectifying device 100 using the U-phase upper-arm. U-phase upper-arm driver circuit 121 compares phase voltage Vu by battery voltage Vb and creates timing to turn on U-phase upper-arm MOSFET 101 when phase voltage Vu exceeds a preset threshold voltage (e.g. Vb+α). At the same time, V-phase lower-arm open phase detecting circuit 142L compares phase voltage Vv of the next phase by the grounding potential (e.g. Vg). When phase voltage Vv is lower than a preset threshold voltage (e.g. Vg), that is when Vv<Vg, V-phase lower-arm open phase detecting circuit 142L outputs U-phase upper-arm permission signal 142a to U-phase upper-arm driver 121 to enable the timing. When phase voltage Vv exceeds a preset threshold voltage (e.g. Vb/2), V-phase lower-arm open phase detecting circuit 142L creates timing to turn off the U-phase upper-arm MOSFET. These ON timing and OFF timing are created into a gate signal for the U-phase upper-arm MOSFET 101. In this way, MOS rectification of U-phase upper-arm MOSFET 101 is allowed.

Contrarily when phase voltage Vv becomes equal to or higher than a preset threshold voltage (e.g. Vg) or when Vv≧Vg, V-phase lower-arm open phase detecting circuit 142L does not output U-phase upper-arm permission signal 142a and disables the ON timing. At the same time, U-phase upper-arm MOSFET 101 stops rectification and performs diode rectification using the body diode of MOSFET 101.

Next will be explained the operation of MOS rectifying device 100 using the U-phase lower-arm. U-phase lower-arm driver circuit 131 compares phase voltage Vu by the grounding potential Vg and creates timing to turn on U-phase lower-arm MOSFET 111 when phase voltage Vu exceeds a preset threshold voltage (e.g. Vg+β). At the same time, V-phase upper-arm open phase detecting circuit 142U compares phase voltage Vv of the next phase by the battery voltage (e.g. Vb). When phase voltage Vv is higher than a preset threshold voltage (e.g. Vb), that is when Vv>Vb, V-phase upper-arm open phase detecting circuit 142U outputs U-phase lower-arm permission signal 142b to U-phase lower-arm driver 131 to enable the timing. When phase voltage Vv goes below a preset threshold voltage (e.g. Vb/2), V-phase upper-arm open phase detecting circuit 142U creates timing to turn off the U-phase lower-arm MOSFET 111. These ON timing and OFF timing are created into a gate signal for the U-phase lower-arm MOSFET. In this way, MOS rectification of U-phase lower-arm MOSFET is allowed.

Contrarily when phase voltage Vv becomes equal to or less than a preset threshold voltage (e.g. Vg), or when Vv≦Vb, V-phase upper-arm open phase detecting circuit 142U does not output U-phase lower-arm permission signal 142b and disables the ON timing. At the same time, U-phase upper-arm MOSFET 101 stops rectification and performs diode rectification using the body diode of MOSFET 101.

The operations of the other arms are basically the same as those of the upper- and lower-arms of U- and V-arms.

As described above, this embodiment enables MOS rectification when the phase voltage of motor generator M/G is normal and diode rectification when an open phase occurs. This can prevent short-circuiting of arms when an open phase occurs and accomplish high-accuracy rectification.

Next will be explained a circuit configuration of U-phase upper-arm driver circuit 121 and V-phase lower-arm open phase detecting circuit 142L which are used in the MOS rectifying device of this embodiment.

Figure 3:
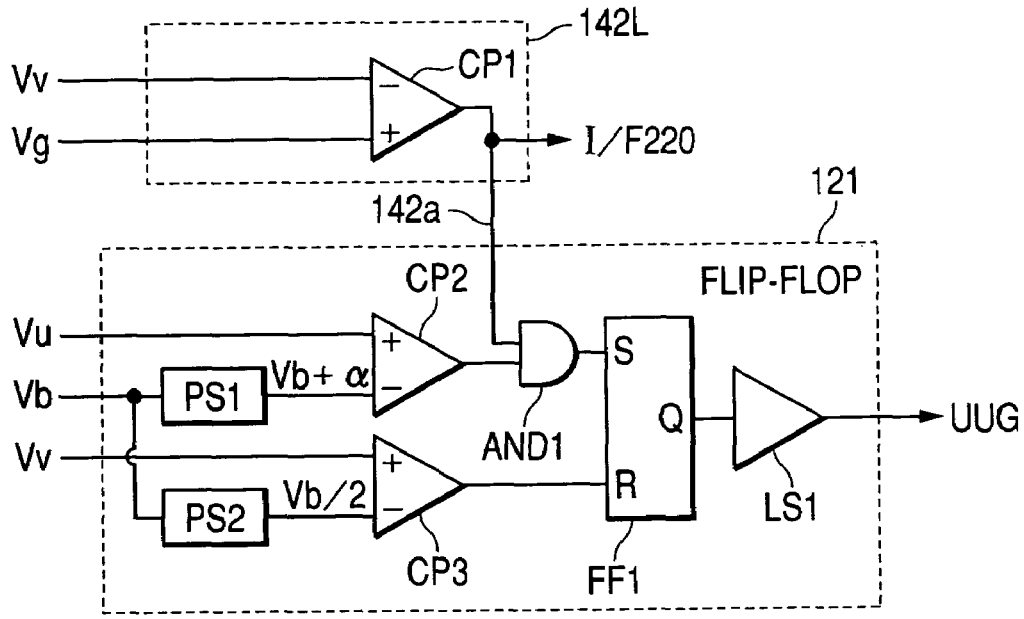
FIG. 3 is a block diagram showing a U-phase upper-arm driver circuit and a V-phase lower-arm open phase detecting circuit which are used in the MOS rectifying device of this embodiment.

FIG. 3 is a block diagram showing a U-phase upper-arm driver circuit and a V-phase lower-arm open phase detecting circuit which are used in the MOS rectifying device of this embodiment. In FIG. 2 and FIG. 3, like parts are designated by like reference numbers.

V-phase lower-arm open phase detecting circuit 142L is equipped with comparator CP1. Comparator CP1 compares phase voltage Vv by the threshold grounding voltage (e.g. Vg). When phase voltage Vv is lower than the threshold voltage (Vg) or when Vv<Vg, comparator CP1 outputs U-phase upper-arm MOSFET permission signal 142a (of High level) to U-phase upper-arm driver circuit 121 and interface circuit 220. When the phase voltage Vv is equal to or higher than the threshold voltage (Vg) or when Vv≧Vg, comparator CP1 outputs U-phase upper-arm MOSFET non-permission signal 142a (of Low level) to U-phase upper-arm driver circuit 121 and interface circuit 220.

U-phase upper-arm driver circuit 121 comprises potential level shift circuits (PS1 and PS2), comparators (CP2 and CP3), AND circuit (AND1), SR type flip-flop (FF1), and voltage level conversion circuit (LS1).

Comparator CP2 compares phase voltage Vu by the battery threshold voltage (e.g. Vb+α). When phase voltage Vu is higher than the threshold voltage (e.g. Vb+α), comparator CP2 outputs a signal (of High level) to turn on the U-phase upper-arm MOSFET. Potential level shift circuit PS1 converts the battery voltage (Vb) to a threshold voltage (e.g. Vb+α). AND circuit AND1 outputs the AND of permission signal 142a and the ON signal of comparator CP1. In other words, AND circuit AND1 allows the ON signal of comparator CP1 to pass when permission signal 142a is High and stops the ON signal of comparator CP1 to pass when permission signal 142a is Low. This enables and disables MOS rectification.

Comparator CP3 compares phase voltage Vv by a threshold voltage (e.g. Vb/2). When phase voltage Vv exceeds the threshold voltage, comparator CP3 outputs a signal (of High level) to turn off the U-phase upper-arm MOSFET. Potential level shift circuit PS2 converts the battery voltage (Vb) to a threshold voltage (e.g. Vb/2). SR type flip-flop FF1 creates a U-phase upper-arm MOSFET gate signal from the ON signal of comparator CP2 and the OFF signal of comparator CP3. Voltage level conversion circuit LS1 converts voltage levels, for example, the output of SR type flip-flop FF1 from 5V to 12V. This converted signal turns on and off U-phase upper-arm MOSFET 101.

In this way, U-phase upper-arm driver circuit 121 judges to enable or disable the MOS rectification of the current phase by the phase voltage level of the mating arm of the next phase. For example, as for a U-phase upper-arm MOSFET, if phase voltage Vv of the V-phase lower-arm is lower than the grounding potential (Vg), U-phase upper-arm driver circuit 121 allows turning on/off of the U-phase upper-arm MOSFET. If phase voltage Vv of the V-phase lower-arm is higher than the grounding potential (Vg), U-phase upper-arm driver circuit 121 does not allow turning on/off of the U-phase upper-arm MOSFET and enables diode rectification.

The above configuration is only a circuit example of accomplishing the driver function and the open phase detecting function and it is apparent that the other configurations are also possible. The other upper-arm driver circuits and open phase detecting circuits are basically identical in operation to the above.

Next will be explained a circuit configuration of U-phase lower-arm driver circuit 131 and V-phase upper-arm open phase detecting circuit 142U which are used in the MOS rectifying device of this embodiment.

Figure 4:
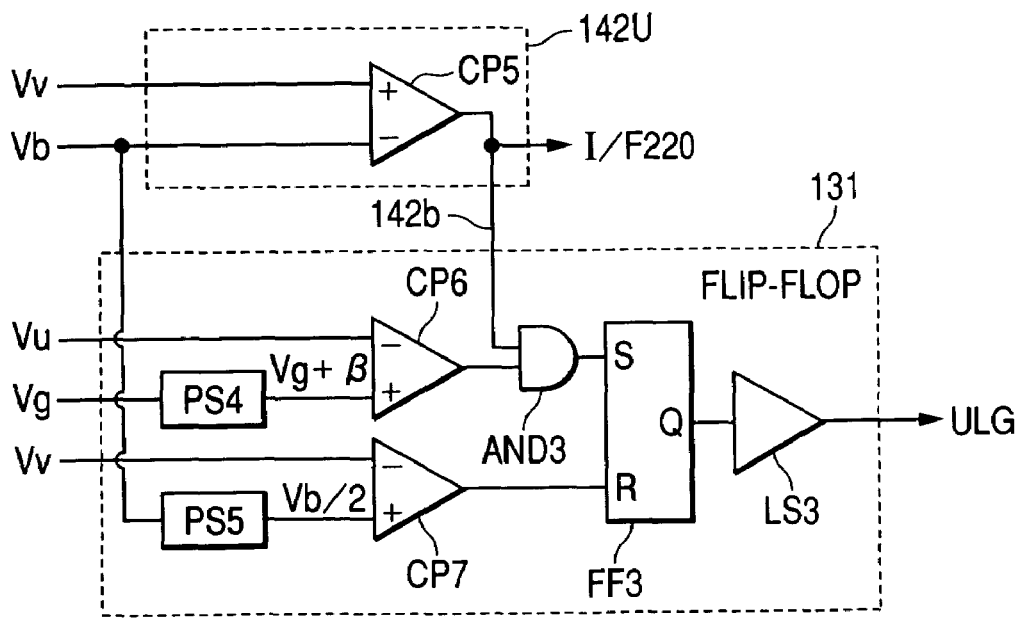
FIG. 4 is a block diagram showing a U-phase lower-arm driver circuit and a V-phase upper-arm open phase detecting circuit which are used in the MOS rectifying device which is an embodiment of this invention.

FIG. 4 is a block diagram showing a U-phase lower-arm driver circuit and a V-phase upper-arm open phase detecting circuit which are used in the MOS rectifying device which is an embodiment of this invention. In FIG. 2 and FIG. 4, like parts are designated by like reference numbers.

V-phase lower-arm open phase detecting circuit 142U is equipped with comparator CP5. Comparator CP5 compares phase voltage Vv by the battery threshold voltage (e.g. Vb). When phase voltage Vv is higher than the threshold voltage (Vb) or when Vv>Vb, comparator CP5 outputs U-phase lower-arm MOSFET permission signal 142b (of High level) to U-phase lower-arm driver circuit 131 and interface circuit 220. When the phase voltage Vv is equal to or lower than the threshold voltage (Vb) or when Vv≦Vg, comparator CP5 outputs U-phase lower-arm MOSFET non-permission signal 142b (of Low level) to U-phase lower-arm driver circuit 131 and interface circuit 220.

U-phase lower-arm driver circuit 131 comprises potential level shift circuits (PS4 and PS5), comparators (CP6 and CP7), AND circuit (AND3), SR type flip-flop (FF3), and voltage level conversion circuit (LS3).

Comparator CP6 compares phase voltage Vu by the ground threshold voltage (e.g. Vg+β). When phase voltage Vu is lower than the threshold voltage (e.g. Vg+β), comparator CP6 outputs a signal (of High level) to turn on the U-phase lower-arm MOSFET. Potential level shift circuit PS4 converts the grounding voltage (Vg) to a threshold voltage (e.g. Vg+β). AND circuit AND3 outputs the AND of permission signal 142b and the ON signal of comparator CP6. In other words, AND circuit AND3 allows the ON signal of comparator CP6 to pass when permission signal 142b is High and stops the ON signal of comparator CP6 to pass when permission signal 142b is Low. This enables and disables MOS rectification.

Comparator CP7 compares phase voltage Vv by a threshold voltage (e.g. Vb/2). When phase voltage Vv goes below the threshold voltage, comparator CP7 outputs a signal (of High level) to turn off the U-phase lower-arm MOSFET. Potential level shift circuit PS5 converts the battery voltage (Vb) to a threshold voltage (e.g. Vb/2). SR type flip-flop FF3 creates a U-phase lower-arm MOSFET gate signal from the ON signal of comparator CP6 and the OFF signal of comparator CP7. Voltage level conversion circuit LS3 converts voltage levels, for example, the output of SR type flip-flop FF3 from 5V to 12V. This converted signal turns on and off lower-arm MOSFET 111.

In this way, U-phase lower-arm driver circuit 131 judges to enable or disable the MOS rectification of the current phase by the phase voltage level of the mating arm of the next phase. For example, as for a U-phase lower-arm MOSFET, if phase voltage Vv of the V-phase upper-arm is higher than the battery potential (Vb), U-phase lower-arm driver circuit 131 allows turning on/off of the U-phase lower-arm MOSFET. If phase voltage Vv of the V-phase upper-arm is lower than the battery potential (Vb), U-phase lower-arm driver circuit 131 does not allow turning on/off of the U-phase lower-arm MOSFET and enables diode rectification.

The above configuration is only a circuit example of accomplishing the driver function and the open phase detecting function and it is apparent that the other configurations are also possible. The other lower-arm driver circuits and open phase detecting circuits are basically identical in operation to the above.

Below will be explained the operation of the MOS rectifying device of this embodiment with reference to FIG. 5 to FIG. 9.

FIG. 5 to FIG. 9 show waveform diagrams to explain the operation of the MOS rectifying device of this embodiment.

Referring to FIG. 5, below will be explained the operation of the MOS rectifying device when no open phase occurs. FIG. 5(A) shows phase voltages Vu, Vv, and Vw of U-, V-, and W phases and threshold voltages Vb+α, Vb/2, and Vg+β. Bold solid, bold broken, and bold dashed lines respectively denote phase voltages Vu, Vv, and Vw in that order. Threshold voltage Vb+α is used to create timing to turn on the upper-arm MOSFET. Threshold voltage Vb/2 is a mid-threshold voltage of the battery and is used to create timing to turn off upper- and lower-arm MOSFETs. Threshold voltage Vg+β is used to create timing to turn on the lower-arm MOSFET.

FIG. 5(B) shows the waveform of U-phase upper-arm gate signal UUG. FIG. 5(C) shows the waveform of U-phase lower-arm gate signal ULG. FIG. 5(D) shows the waveform of V-phase upper-arm gate signal VUG. FIG. 5(E) shows the waveform of V-phase lower-arm gate signal VLG. FIG. 5(F) shows the waveform of W-phase upper-arm gate signal WUG. FIG. 5(G) shows the waveform of W-phase lower-arm gate signal WLG. Since upper-arm MOSFETs are p-MOS field effect transistors, the upper-arm MOSFETs turn off when upper-arm gate signals UUG, VUG, and WUG are High and turn on when the gate signals are Low. Similarly, since lower-arm MOSFETs are n-MOS field effect transistors, the lower-arm MOSFETs turn off when lower-arm gate signals ULG, VLG, and WLG are Low and turn on when the gate signals are High.

Below will be explained the waveform of U-phase upper-arm gate signals. The waveforms of the other phases are basically identical.

As explained in FIG. 3, the U-phase upper-am MOSFET permission signal is output when Vv<Vg. As shown in FIG. 5(A), when phase voltage Vu goes over battery voltage Vb and reaches threshold voltage Vb+α (point "a" in FIG. 5), phase voltage Vv of the V-phase lower-arm is lower than the grounding potential (Vg, point "b" in FIG. 5). Therefore, the U-phase upper-arm MOSFET is allowed to perform rectification.

As shown in FIG. 5(B), the U-phase upper-arm gate signal (UUG) becomes Low at timing "a" and turns on the U-phase upper-arm MOSFET. When Vv>Vb/2, UUG becomes High and turns on the U-phase upper-arm MOSFET.

When phase voltage Vu goes below the grounding potential (Vg) and reaches threshold voltage Vg+β (point "c" in FIG. 5), phase voltage Vv of the V-phase upper-arm is higher than the battery voltage (Vb, point "d" in FIG. 5). Therefore, the U-phase lower-arm MOSFET is allowed to perform rectification. As shown in FIG. 5(C), the U-phase lower-arm gate signal (ULG) becomes High at timing "c" and turns on the U-phase lower-arm MOSFET. When Vv<Vb/2, ULG becomes Low and turns off the U-phase lower-arm MOSFET.

Referring to FIG. 6, below will be explained the operation of the MOS rectifying device when a V-open phase occurs. FIG. 6(A) to FIG. 6(G) are similar to FIG. 5(A) to FIG. 5(G). This example assumes phase voltage Vv is temporarily fixed to the grounding potential or its vicinity. The dotted waveforms in FIG. 6(B) and FIG. 6(E) represent waveforms when no V-open phase occurs. The solid waveforms represent those when a V-open phase occurs.

Figure 6A:
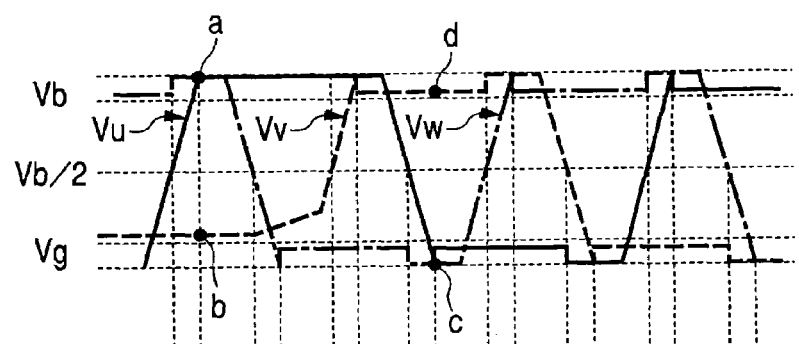
FIG. 6 shows waveform diagrams to explain the operation of the MOS rectifying device of this embodiment.
Figure 6B:

Although the operation waveforms of U-phase gate signals are explained below, they are basically identical to those of the other phases. As already explained referring to FIG. 3, the U-phase upper-arm MOSFET permission signal is output when Vv<Vg. As shown in FIG. 6(A), when phase voltage Vu goes over battery voltage Vb and reaches threshold voltage Vb+α (point "a" in FIG. 6), phase voltage Vv of the V-phase lower-arm is higher than the grounding potential (Vg, point "b" in FIG. 6). Therefore, the U-phase upper-arm MOSFET is not allowed to perform rectification and UUG keeps High. As the result, the U-phase lower-arm MOSFET remains OFF and does not turn on at timing "a". Therefore, the U-phase voltage is rectified by the body diode of the U-phase upper-arm MOSFET during this period.

Figure 6C:
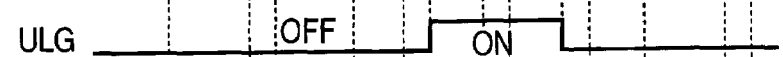
Figure 6D:
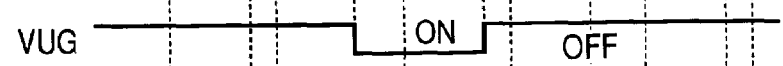
Figure 6E:
Figure 6F:
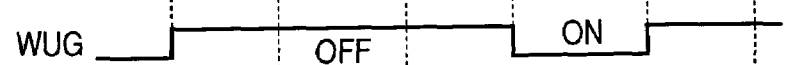

As for the lower-arm MOSFET, when phase voltage Vu goes below the grounding potential (Vg) and reaches threshold voltage Vg+β (point "c" in FIG. 6), phase voltage Vv of the V-phase upper-arm is higher than the battery voltage (Vb, point "d" in FIG. 6). Therefore, the U-phase lower-arm MOSFET is allowed to perform MOS rectification. As shown in FIG. 6(C), ULG becomes High at timing "c" and turns on the U-phase lower-arm MOSFET. When Vv<Vb/2, ULG becomes Low and turns off the U-phase lower-arm MOSFET.

Figure 6G:

Referring to FIG. 7, below will be explained another operation of the MOS rectifying device when a V-open phase occurs. FIG. 7(A) to FIG. 6(G) are similar to FIG. 5(A) to FIG. 5(G). This example assumes phase voltage Vv is temporarily fixed to the battery potential or its vicinity. The dotted waveforms in FIG. 7(C) and FIG. 7(D) represent waveforms when no V-open phase occurs. The solid waveforms represent those when a V-open phase occurs.

Figure 7A:
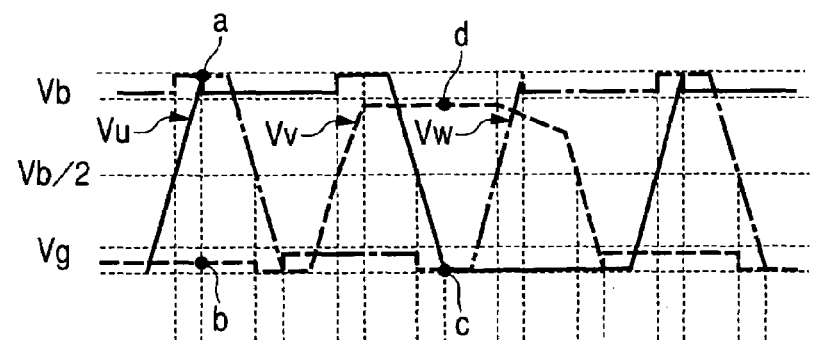
FIG. 7 shows waveform diagrams to explain the operation of the MOS rectifying device of this embodiment.
Figure 7B:
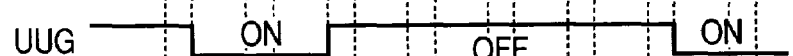
Figure 7C:
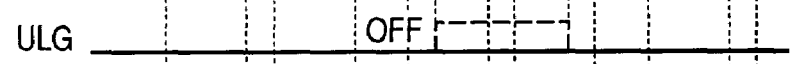
Figure 7D:
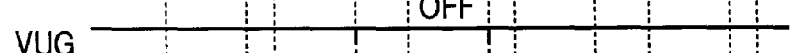
Figure 7E:
Figure 7F:
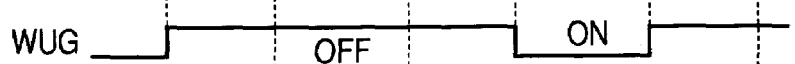
Figure 7G:

Although the operation waveforms of U-phase gate signals are explained below, they are basically identical to those of the other phases. As already explained referring to FIG. 3, the U-phase upper-arm MOSFET permission signal is output when Vv<Vg. As shown in FIG. 7(A), when phase voltage Vu goes over battery voltage Vb and reaches threshold voltage Vb+α (point "a" in FIG. 6), phase voltage Vv of the V-phase lower-arm is lower than the grounding potential (Vg, point "b" in FIG. 6). Therefore, the U-phase upper-arm MOSFET is allowed to perform MOS rectification and UUG has a waveform as shown in FIG. 7(B). When phase voltage Vu goes below the grounding potential (Vg) and reaches threshold voltage Vg+β (point "c" in FIG. 7), phase voltage Vv of the V-phase upper-arm is lower than the battery voltage (Vb) (point "d" in FIG. 7). Therefore, the U-phase lower-arm MOSFET is not allowed to perform MOS rectification and ULG has a waveform as shown in FIG. 7(C).

Referring to FIG. 8, below will be explained another operation of the MOS rectifying device when a V-open phase occurs. FIG. 8(A) to FIG. 8(G) are similar to FIG. 5(A) to FIG. 5(G). This example assumes phase voltage Vv is permanently fixed to the grounding potential or its vicinity. The dotted waveforms in FIG. 8(B) to FIG. 8(E) represent waveforms when no V-open phase occurs. The solid waveforms represent those when a V-open phase occurs.

Although the operation waveforms of U-phase gate signals are explained below, they are basically identical to those of the other phases. As already explained referring to FIG. 3, the U-phase upper-arm MOSFET permission signal is output when Vv<Vg. As shown in FIG. 8(A), when phase voltage Vu goes over battery voltage Vb and reaches threshold voltage Vb+α (point "a" in FIG. 6), phase voltage Vv of the V-phase lower-arm is lower than the grounding potential (Vg, point "b" in FIG. 6). Therefore, the U-phase upper-arm MOSFET is allowed to perform MOS rectification and UUG has a waveform as shown in FIG. 8(B). When phase voltage Vu goes below the grounding potential (Vg) and reaches threshold voltage Vg+β (point "c" in FIG. 7), phase voltage Vv of the V-phase upper-arm is lower than the battery voltage (Vb) (point "d" in FIG. 7). Therefore, the U-phase lower-arm MOSFET is not allowed to perform MOS rectification and ULG has a waveform as shown in FIG. 8(C).

Referring to FIG. 9, below will be explained another operation of the MOS rectifying device when a V-open phase occurs. FIG. 9(A) to FIG. 9(G) are similar to FIG. 5(A) to FIG. 5(G). This example assumes phase voltage Vv is permanently fixed to the grounding potential or its vicinity. The dotted waveforms in FIG. 9(B) to FIG. 9(E) represent waveforms when no V-open phase occurs. The solid waveforms represent those when a V-open phase occurs.

Although the operation waveforms of U-phase gate signals are explained below, they are basically identical to those of the other phases. As already explained referring to FIG. 3, the U-phase upper-arm MOSFET permission signal is output when Vv<Vg. As shown in FIG. 9(A), when phase voltage Vu goes over battery voltage Vb and reaches threshold voltage Vb+α (point "a" in FIG. 9), phase voltage Vv of the V-phase lower-arm is higher than the grounding potential (Vg, point "b" in FIG. 6). Therefore, the U-phase upper-arm MOSFET is not allowed to perform rectification and UUG has a waveform as shown in FIG. 9(B). When phase voltage Vu goes below the grounding potential (Vg) and reaches threshold voltage Vg+β (point "c" in FIG. 9), phase voltage Vv of the V-phase upper-arm is lower than the battery voltage (Vb, point "d" in FIG. 9). Therefore, the U-phase lower-arm MOSFET is not allowed to perform MOS rectification and UUG has a waveform as shown in FIG. 9(C).

Although the above description assumes synchronous rectification of a synchronous motor having MOSFETs on both upper and lower arms, this embodiment is applicable to a synchronous motor having a diode on the upper arm and MOSFET on the lower arm only. In this case, an open phase detecting circuit has only to be provided in the generation control circuit of the lower arm.

Next will be explained the configuration of an electro-mechanical inverter-housed motor generator which is equipped with a MOS rectifying device of this embodiment referring to FIG. 10 and FIG. 11.

Figure 10:
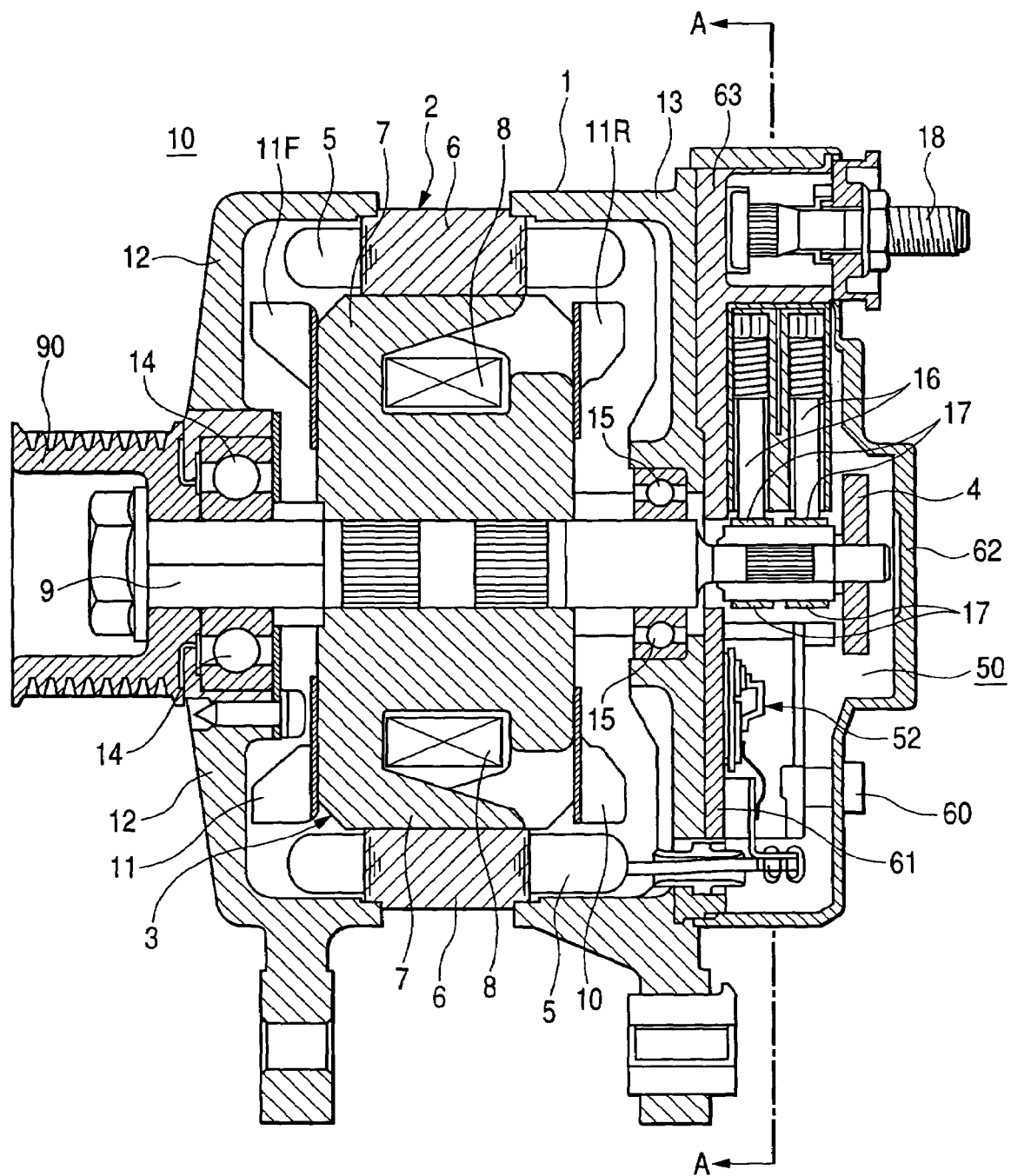
FIG. 10 is a cross-sectional view of an electromechanical inverter-housed motor generator equipped with a MOS rectifying device which is an embodiment of this invention.

FIG. 10 is a cross-sectional view of an electro-mechanical inverter-housed motor generator equipped with a MOS rectifying device which is an embodiment of this invention. FIG. 11 is a cross-sectional view taken on line A-A of FIG. 10.

As shown in FIG. 10, motor generator M/G of inverter-housed motor generator (M/G) 10 is equipped with stator 2 and rotor 3. Stator 2 comprises stator core 6 and stator winding 5 which is wound around the stator core. Stator core 6 is a cylindrical lamination of silicon steel segmental punchings. Two endplates which axially sandwich the lamination of the segmental punchings are respectively thicker than each punching of the lamination. A core back (not shown in the drawing) is formed on the outer periphery of the stator core 6. The core back is a continuous cylindrical core part formed on the circumference of the motor casing and axially sandwiched by front bracket 12 and rear bracket 13 with its outer periphery exposed to the outside. With this, stator 2 is held between the brackets. Many teeth are formed on the inner periphery of the core back which is the inner periphery of the stator core. The teeth are teeth-shaped iron core parts which project radially-inwardly from the inner peripheral surface of the core back. They are continuously formed axially at a preset interval along the inner peripheral surface of the core back. A slot (not shown in the drawing) is provided between every two adjoining teeth. (The number of slots is equal to the number of teeth.) Each slot is a space to accommodate a winding conductor of stator winding 5. Similarly to the teeth, the slots are continuously formed axially and spaced at a preset interval circumferentially. Each slot opens opposite to the core back and also opens at each axial end of the slot. Each slot accommodates a winding conductor of stator winding 5. Each winding conductor is a rectangular or round wire, projects outwards from both axial ends of stator core, and connected to form a star connection.

Rotor 3 is provided inside stator 2 oppositely to the rotor with a clearance therebetween. Rotor 3 has a rotary shaft 9 on the central axis of rotor 3. One axial end of rotary shaft 9 is pivotally supported by bearing 14 which is provided in the center of front bracket 12. The other axial end of rotary shaft 9 is pivotally supported by bearing 15 which is provided in the center of rear bracket 13. Rotor core 7 is fitted to rotary shaft 9 at a place at which rotary shaft 9 is opposite the inner surface of rotor 2. Rotor core 7 is provided to make a pair of claw-shaped pole cores axially opposite each other. The claw-shaped pole cores extend radially-outwardly from the cylindrical core part. The triangular or trapezoidal front ends have a plurality of claw-shaped poles which are bent perpendicular to their opposite direction. The claw-shaped poles are spaced at a preset interval along the rotational direction. When claw-shaped pole cores are provided to be axially opposite each other, they are disposed between the claw-shaped poles of the opposite pole cores. One of the claw-shaped pole core forms an N or S pole and the other claw-shaped pole core forms an opposite pole. With this, N and S poles are alternately formed on rotor 3 so that poles may be disposed alternately along the direction of revolution. Field winding 8 is provided on the outer surface of the core which faces to the inner side of the front end of the claw-shaped pole. One axial end of the rotary shaft 9 (on the front bracket 12 side) axially extends further above bearing 14. The extending part of the rotary shaft is equipped with pulley 90. Pulley 90 is connected to a pulley of the engine with a belt (not shown in the drawing). The other axial end of rotary shaft 9 (on the rear bracket 13 side) axially extends further above bearing 15. This extending part of the rotary shaft 9 is equipped with slip ring 17. Slip ring 17 is electrically connected to field winding 8. Brush 16 is slidably in contact with slip ring 17. Brush 16 transfers a field current from field winding 8 to slip ring 17. One axial end of the claw-shaped pole core (on the front bracket 12 side) is equipped with front fan 11F. The other axial end of the claw-shaped pole core (on the rear bracket 13 side) is equipped with rear fan 11R. Front fan 11F and rear fan 11R revolve in synchronism with the revolution of rotor 3 to blow the ambient air (as a cooling medium) into the motor generator, circulate the air in the motor generator to cool, and blow out the used air to the outside of the motor generator. To blow in and out air to and from the motor generator, front bracket 12 and rear bracket 13 have a plurality of through-holes for ventilation.

A space is formed by module cases 62 and 63 on one side of rear bracket 13 (opposite the front bracket 12 side). This space contains inverter unit 50. Module case 63 also works as a brush holder to hold brush 16. Communication terminal 60 and battery terminal 18 are projected outward from module case 62. Rear bracket 13 is electrically connected to the chassis. The positive electrode of inverter unit 50 is electrically connected to battery terminal 18 and the negative electrode (ground) is electrically connected to rear bracket 13. This configuration is compatible with general alternating current generators for vehicles.

Below will be explained a detailed disposition and configuration of inverter unit 50 with reference to FIG. 11. Part 64 is a p-MOSFET (equivalent to upper-arm MOSFET 101, 102, or 103) and part 65 is an n-MOSFET (equivalent to lower-arm MOSFET 111, 112, or 113). The other parts are insulating board 66, heat-radiating conductive plate 61, output terminal 67, power wires 70P and 70N, positive power terminal 71, control circuit board 72, control IC 51 (control section) (equivalent to generation control circuit 130, open phase detecting circuit 140, and inverter control circuit 210 in FIG. 2), communication terminal 60 (equivalent to interface circuit 220 in FIG. 2), wire 74 to connect the source electrode of p-MOSFET 64 to power wire 70P, wire 75 to connect the source electrode of n-MOSFET 65 to heat-radiating conductive plate 61, wire 76 to connect the conductive plate of insulating board 66 to output terminal 67, rotary sensor 73, wire 77 to connect p-MOSFET which constitutes diode 68 to power wire 70P, wire 78 to connect the insulating board to power wire 70N, wire 69 to connect the source electrode of n-MOSFET 69 to heat-radiating conductive plate 61, and aluminum wire 80 to connect p-MOSFET 64 and n-MOSFETs 65 and 69 respectively to control circuit board 72.

Figure 11:
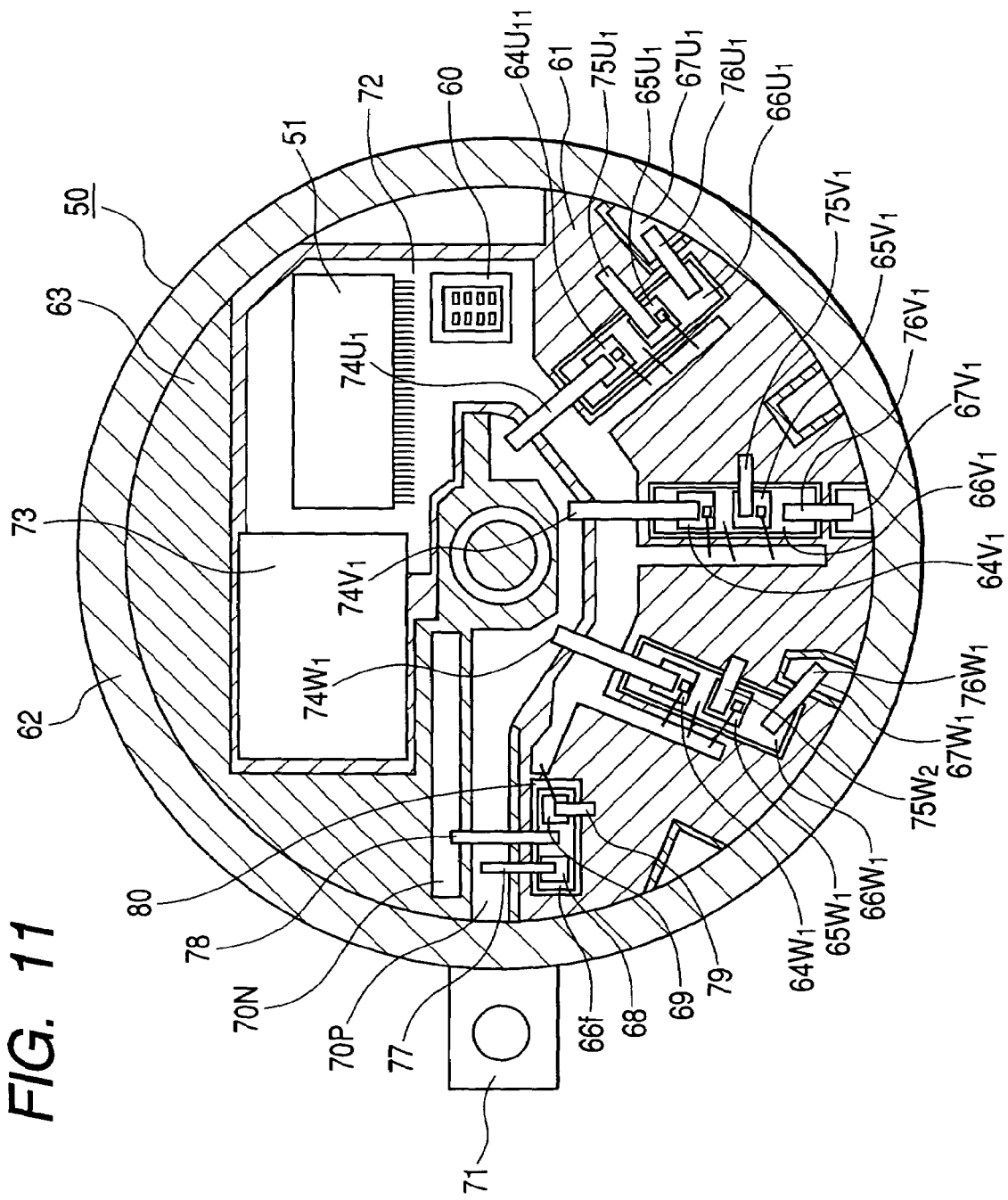
FIG. 11 is a cross-sectional view taken on line A-A of FIG. 10.

As shown in FIG. 11, the upper half of the space in module cases 62 and 63 contains control section 51 and rotary sensor 73. The lower half thereof contains module section 52. Drain electrodes of p-MOSFET 64 and n-MOSFET 65 are connected to a conductive plate which is laminated to insulating board 66. The source electrode of p-MOSFET 64 is connected to power wire 70P with wire 74. The source electrode of n-MOSFET 65 is connected to heat-radiating conductive plate 61 (which also works as a grounding wire) with wire 75. The conductive plate of insulating board 66 is connected to output terminal with wire 76. In this configuration, the mounted structures (arms of phases which constitute the bridge circuit) of FIG. 1 are radially disposed to extend radially in the lower half of the space in module cases 62 and 63. Symbols U1, V1, and W1 are respectively corresponding to U, V, and W phases of stator windings 5. Output terminal 67 is connected to stator winding 5 of the associated phase.

Output terminals 67, power terminals 71, and power wires (70P and 70N) are embedded in module case 63 with their surfaces exposed to the outside on module case 63. Part of module case 63 is bonded to heat-radiating conductive plate 61.

The electronic circuit elements constituting control section 51 are integrated into a single IC chip. Control IC 51 is provided on control circuit board 72 and electrically connected to the board (72). p-MOSFET 64 and n-MOSFETs 65 and 69 of module section 52 are connected to control circuit board 72 with aluminum wire 80. Communication terminal 60 and rotary sensor 73 are also connected electrically to control circuit board 72. Communication terminal 60 is used for communication with engine control unit 140. Rotary sensor 73 detects magnetism on polar disk 4 which is provided on the end of rotary shaft 9 and gets the rotational speed of the motor generator.

p-MOSFET 68 is used as a diode by making the gate potential equal to source potential. With this, the drain electrodes of p-MOSFET 68 and n-MOSFET 69 are connected to the conductive board of insulating board 66*f* as well as MOSFETs in the bridge circuit.

Control IC 51 is equipped with regulator IC functions for general alternating current vehicle generators. In other words, control IC 51 can also work as a regulator IC. As already explained, an electric rotating machine equipped with an inverter unit must be resistant to high temperature. It is also necessary to suppress heat generation of semiconductor elements in the bridge circuit 110 and temperature rise of the inverter unit itself. Particularly when the machine is used for idle-stopping, the motor generator is used as an engine starter for a very short time (about 1 second or shorter) and mostly used as a power generator. Therefore, to reduce the power generation loss is very effective to suppress temperature rise of the inverter unit.

When the synchronous rectification function is not used, rectification is carried out by a diode in each MOS semiconductor element which constitutes the bridge circuit. For example, when a current of 50 A flows through a diode, its heat generation is about 50 watts (=50 A×1V of the required built-in potential). Contrarily since the ON resistance of a MOSFET is about 3 mΩ, when a current of 50 A is applied to the MOSFET, its heat generation is about 7.5 watts (=about 3 mΩ×50 A×50 A). This means that the heat generation of the diode is about 7 times as much as the heat generation of the MOSFET. Judging from this, synchronous rectification at the generation time is very effective to suppress temperature rise of the inverter unit itself. Further, heat generation can be suppressed by increasing the installation space of semiconductor elements in the bridge circuit. However, a very wide installation space (about 7 times) is required to dissipate heat generation of the diode. This is not preferable in terms of downsizing and cost reduction of products. Judging from the above, this embodiment adds a synchronous rectification function to control IC 51.

Next will be explained a configuration of a motor vehicle equipped with an inverter-housed motor generator which comprises a MOS rectifying device of this invention.

Figure 12:
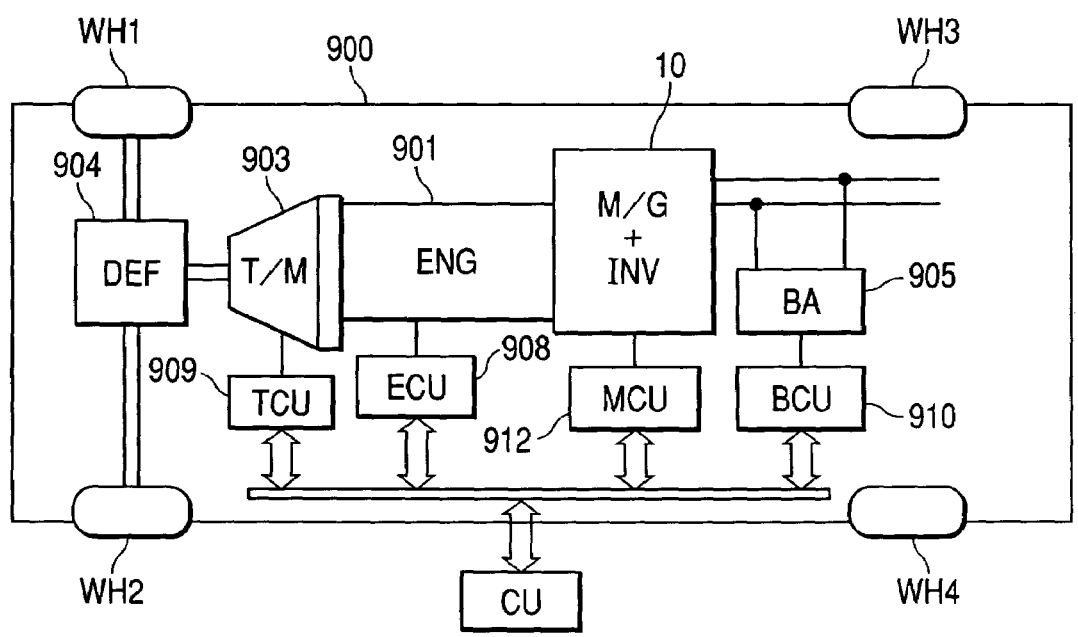
FIG. 12 shows a block diagram of configuration of a motor vehicle equipped with an inverter-housed motor generator using a MOS rectifying device of this invention.

FIG. 12 shows a block diagram of configuration of a motor vehicle equipped with an inverter-housed motor generator using a MOS rectifying device of this invention.

Motor vehicle 900 is equipped with engine (ENG) 901 and inverter-housed motor generator (M/G) 10. The driving forces generated by the engine (901) and the motor generator (10) are transmitted to wheels WH1 and WH2 through transmission unit (T/M) 903 and differential gear unit (DEF) 904 to run the vehicle.

Herein, the inverter-housed motor generator (M/G) 10 is used as a motor for assisting the engine (ENG) 901. It is noted that this embodiment can be applied to a parallel power transmission system in which wheels are driven independently by an engine or a motor.

Motor generator (M/G) 10 is controlled by motor control unit (MCU) 912. When motor generator (M/G) 10 works as a power generator, the MOS rectifying device of this invention works to perform rectification. When the motor generator of inverter-housed motor generator (M/G) 10 is driven by the engine, the generated voltage is rectified by the MOS rectifying device and stored in battery BA.

Host controller (CU) 911 collectively controls motor control unit (MCU) 912, engine control unit (ECU) 908 to control engine (ENG) 901, transmission control unit (TCU) 909 to control transmission unit (T/M) 903, and battery control unit (BCU) 910 to control the battery.

Even when any cut dust short-circuits a phase terminal (U, V, and/or W phases) to a ground potential, this embodiment can assure high-accuracy rectification since the open phase detecting circuit changes from MOS rectification to diode rectification and prevents the upper- and lower-arm MOSFETs from being short-circuited.

What is claimed is:

1. A metal-oxide semiconductor (MOS) rectifying device that is connected between a 3-phase alternating current (AC) generator and a direct current (DC) power source, the DC power source being charged by electric power supplied from said 3-phase AC generator, comprising:
   a bridge circuit, connected between said 3-phase AC generator and said DC power source, having 3-phase upper- and lower-arms, each of the upper- and lower-arms comprising a plurality of metal-oxide semiconductor field-effect transistors (MOSFETs);
   a first comparator that compares a first phase voltage of the 3-phase AC generator with a positive electrode potential of said DC power source;
   a lower-arm driver that, based on an output of said first comparator, starts the drive of a MOSFET of the lower-arm associated with a phase voltage before the first phase voltage;
   a second comparator that compares the first phase voltage of the 3-phase AC generator with a negative electrode potential of said DC power source; and
   an upper-arm driver that, based on an output of said second comparator, starts the drive of a MOSFET of the upper-arm associated with a phase voltage before the first phase voltage; and
   an error detector that detects an output voltage error of said 3-phase AC generator based on the output of said first and second comparators, wherein
   said lower-arm driver and said upper-arm driver turn off all of said plurality of MOSFETs based on an output of said error detector.

2. A motor generator that houses a metal-oxide semiconductor (MOS) rectifying device, wherein said MOS rectifying device comprises:
   a bridge circuit, connected between a 3-phase alternating current (AC) generator and a direct current (DC) power source that is charged by electric power supplied from said 3-phase AC generator, having 3-phase upper- and lower-arms, each of the upper- and lower-arms comprising a plurality of metal-oxide semiconductor field-effect transistors (MOSFETs);
   a first comparator that compares a first phase voltage of the 3-phase AC generator with a positive electrode potential of said DC power source; and
   a lower-arm driver that, based on an output of the first comparator, starts the drive of a MOSFET of the lower-arm associated with a phase voltage before the first phase voltage, wherein:
   said bridge circuit is connected between an armature coil of said AC generator and said DC power source,
   said bridge circuit includes an inverter function to invert DC electric power from said DC power source into AC electric power, and to supply the AC electric power to said armature coil, and a converter function to convert the AC electric power generated by said AC generator into DC electric power, and to supply the DC electric power to said DC power source,
   said MOS rectifying device is equipped with an error detector that detects, based on the output of said first comparator, an error of phase voltage at the time of power generation by the converter function of said bridge circuit,
   said lower-arm driver turns off said MOSFETs of the lower-arm based on the detection result of said error detector.

3. A motor vehicle that has a motor generator that houses a metal-oxide semiconductor (MOS) rectifying device as driving source, wherein said MOS rectifying device comprises:
   a bridge circuit, connected between a 3-phase alternating current (AC) generator and a direct current (DC) power source that is charged by electric power supplied from said 3-phase AC generator, having 3-phase upper- and lower-arms, each of the upper- and lower-arms comprising a plurality of metal-oxide semiconductor field-effect transistors (MOSFETs);

a first comparator that compares a first phase voltage of the 3-phase AC generator with a positive electrode potential of said DC power source; and a lower-arm driver that, based on an output of the first comparator, starts the drive of MOSFET of the lower-arm associated with a phase voltage before the first phase voltage, wherein said MOS rectifying device comprises an error detector that detects a phase voltage error in said 3-phase AC generator, and informs a host control unit of the error, and said lower-arm driver turns off said lower-arm MOSFETs based on an output of said error detector.

4. A motor vehicle that has a motor generator that houses a metal-oxide semiconductor (MOS) rectifying device as driving source, wherein said MOS rectifying device comprises:

a bridge circuit, connected between a 3-phase alternating current (AC) generator and a direct current (DC) power source that is charged by electric power supplied from said 3-phase AC generator, having 3-phase upper- and lower-arms, each of the upper- and lower-arms comprising a plurality of metal-oxide semiconductor field-effect transistors (MOSFETs);

a first comparator that compares a first phase voltage of the 3-phase AC generator with a positive electrode potential of said DC power source;

a lower-arm driver that, based on an output of the first comparator, starts the drive of MOSFET of the lower-arm associated with a phase voltage before the first phase voltage; and an error detector that detects a phase voltage error in said 3-phase AC generator based on the output of said first comparator and informs a host control unit of the error, and when the error lasts longer than a preset time period, turns off said plurality of MOSFETs by generating a control signal from said host controller to switch said MOS rectifying device to a diode rectifying device.

* * * * *